No. 688,514. Patented Dec. 10, 1901.
E. E. HANNA.
HOSE COUPLING.
(Application filed Nov. 2, 1900.)
(No Model.)
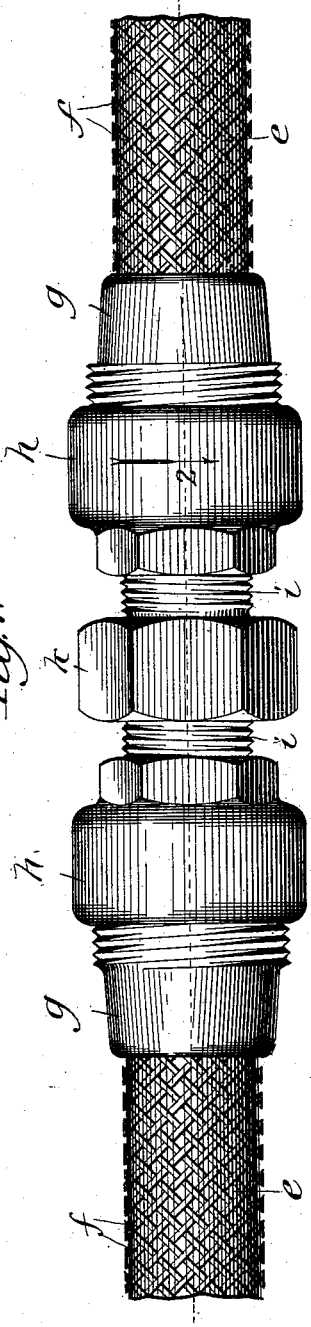
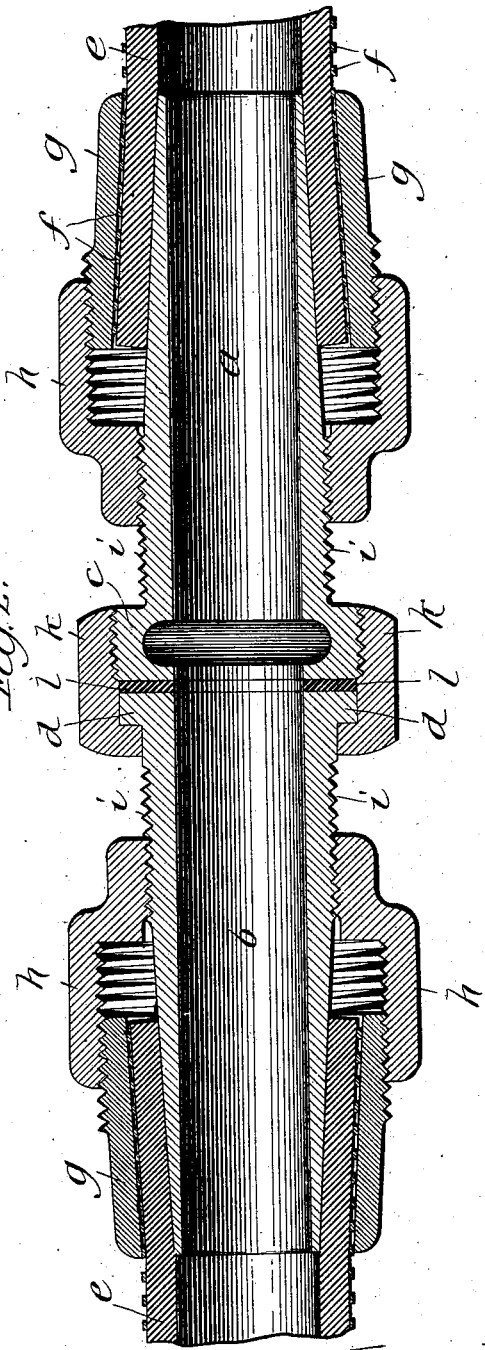

UNITED STATES PATENT OFFICE.

ELMER E. HANNA, OF CHICAGO, ILLINOIS.

HOSE-COUPLING.

SPECIFICATION forming part of Letters Patent No. 688,514, dated December 10, 1901.

Application filed November 2, 1900. Serial No. 35,192. (No model.)

*To all whom it may concern:*

Be it known that I, ELMER E. HANNA, a citizen of the United States, residing at Chicago, in the county of Cook and State of Illinois, have invented certain new and useful Improvements in Hose-Couplings, of which the following is a specification.

The invention relates particularly to hose-couplings which are adapted to connect and disconnect two pieces of hose, and particularly to that class of hose-couplings which are adapted to be used in connection with hose-pipes for the conduction of air under pressure.

The object of the invention is to provide a simple, economical, and efficient hose-coupling; and the invention consists in the features, combinations, and details of construction hereinafter described and claimed.

In the accompanying drawings, Figure 1 is an elevation of a coupling constructed in accordance with my improvements as it appears when in use; and Fig. 2, a longitudinal sectional view of the same, taken on line 2 of Fig. 1, looking in the direction of the arrow.

In the art to which this invention relates it is well known that the ordinary hose-pipe used for the conduction of air under pressure has to withstand severe internal pressure and as a consequence is liable to be destroyed or distorted unless provided with a suitable armor to confine and protect it. When such armor is used, it is very difficult to hold the same in connection with the hose-pipe, as well as hard to couple two or more pieces together. The principal object of my invention, therefore, is to provide a coupling for hose-pipes which can be used for coupling the same together with or without the use of armor, all of which will more fully hereinafter appear.

In the construction of a coupling in accordance with my improvements I make what I term two internal tubular expanders $a$ and $b$, which are identical in all respects, with the exception that the external shoulder $c$ of the expander $a$ is screw-threaded, while the external shoulder $d$ of the expander $b$ is left plain. These expanders are adapted to be inserted into the interior of the two pieces of hose-pipe $e\ e$ and open out the same, as clearly shown in Fig. 2 of the drawings. The pieces of hose-pipe are provided with an armor $f$, formed of woven flat metallic strips which protect it against undue expansion, distortion, or disruption.

It is very desirable to provide means by which the protected hose may be held in engagement with the coupling, so that two or more pieces may be readily connected and disconnected. In order to accomplish this result, hollow clamping-sleeves $g\ g$ are provided, one for each of the expanding-tubes, the internal bore of which is substantially the same taper as the tapered portion of the expanding-tube which it surrounds. The pieces of hose are grasped between it and the expanding portion of the tube.

To hold the clamping-sleeves in position and firmly clamp the armored hose, compound or differential nuts $h$ are provided, preferably having right and left hand threaded bores, a left-hand thread where it engages with the threaded portion $i$ of the expanding-tube and a right-hand thread where it engages with the external threads on the clamping-sleeve.

To detachably couple the two expanding-tubes with their clamping-sleeves together, a union-nut $k$ is provided, having an internal-threaded bore arranged to engage with the threaded shoulder on the expanding-tube $a$ and an inwardly-projecting annular portion loosely engaging with the plain shoulder on the expanding-tube $b$. Between these two expanding tubular portions is arranged a gasket $l$ to hermetically seal the same; but the gasket can be dispensed with and the ordinary "thin" edge used in unions substituted therefor.

While I have described my invention with more or less minuteness as regards details of form, construction, and arrangement, I do not desire to be understood as limiting myself unduly thereby or any more than is pointed out in the claims. On the contrary, I contemplate all proper changes in form, construction, and arrangement which circumstances may demand or necessity render expedient. For instance, the union-nut in some cases might be dispensed with by making the two expanding-tubes in one piece and detachably connecting the clamping-sleeves together with one differential nut.

I claim—

1. In a coupling of the class described, the combination of an inner tubular expanding mechanism, outer clamping-sleeve mechanism surrounding the same between which and the tubular portion the hose may be clamped, and nut mechanism in threaded engagement with each of the clamping-sleeves for holding them in position, and a union-nut in threaded engagement with the expanding mechanism, substantially as described.

2. In a coupling of the class described, the combination of a pair of inner relatively non-rotatable expanding-tubes arranged to be inserted within the hose-pipe, a relatively non-rotatable clamping-sleeve independently surrounding each of the expanding-tubes to grasp the hose between them and the tubes, and means out of contact with the hose and in engagement with each sleeve for moving and holding them in position, and a nut rotatably mounted upon one inner expanding-tube and in threaded connection with the other, substantially as described.

3. In a coupling of the class described, the combination of two relatively non-rotatable expanding-tubes arranged to be inserted within pieces of hose-pipe, a relatively non-rotatable clamping-sleeve surrounding each expanding-tube, a nut out of engagement with the hose-pipe for each clamping-sleeve and having threaded engagement with a clamping-sleeve and expanding-tube to hold such parts in position and clamp the hose between them, and a nut rotatably mounted upon one expanding-tube and in threaded connection with the other, substantially as described.

4. In a coupling of the class described, the combination of two inner expanding-tubes provided with external threads and shoulders at their outer ends, one tube having its shoulder threaded, an externally-threaded clamping-sleeve surrounding the expanding portion of each tube to grasp the hose between it and the tube, the external thread on such sleeve being differential from that in the tube, a differentially-threaded nut securing the clamping-sleeves and expanding-tubes together in pairs, and a union-nut detachably and loosely securing the expanding-tubes together, substantially as described.

5. In a coupling of the class described, the combination of two expanding-tubes arranged to be inserted within pieces of hose-pipe, a clamping-sleeve surrounding each expanding-tube, a nut upon each clamping-sleeve forming a threaded connection between the clamping-sleeve and the expanding-tube therein for holding them in position to grasp the hose between them, a smooth annular shoulder upon one end of one of the expanding-tubes, and a union-nut mounted upon the inner adjacent ends of the expanding-tubes and in threaded connection with one of such tubes for detachably securing the expanding-tubes together, substantially as described.

ELMER E. HANNA.

Witnesses:
THOMAS F. SHERIDAN,
HARRY IRWIN CROMER.